United States Patent
Han et al.

(10) Patent No.: US 10,713,478 B2
(45) Date of Patent: Jul. 14, 2020

(54) BEHAVIOUR PATTERN ANALYSIS SYSTEM AND METHOD USING DEPTH IMAGE

(71) Applicants: KOREA INSTITUTE OF INDUSTRIAL TECHNOLOGY, Cheonan-si, Chungcheongnam-do (KR); KOREA RESEARCH INSTITUTE OF BIOSCIENCE AND BIOTECHNOLOGY, Daejeon (KR)

(72) Inventors: Sang Kuy Han, Cheonan-si (KR); Keyoung Jin Chun, Uiwang-si (KR); Kyu Tae Chang, Changwon-si (KR); Young Jeon Lee, Cheongju-si (KR); Yeung Bae Jin, Cheongju-si (KR); Kang jin Jeong, Cheongju-si (KR); Phil Yong Kang, Cheongju-si (KR); Jung Joo Hong, Cheongju-si (KR); Sang Rae Lee, Cheongju-si (KR)

(73) Assignees: KOREA INSTITUTE OF INDUSTRIAL TECHNOLOGY, Cheonan-si, Chungcheongnam-Do (KR); KOREA RESEARCH INSTITUTE OF BIOSCIENCE AND BIOTECHNOLOGY, Daejeon (KR)

( * ) Notice: Subject to any disclaimer, the term of this patent is extended or adjusted under 35 U.S.C. 154(b) by 63 days.

(21) Appl. No.: 15/779,913

(22) PCT Filed: Nov. 30, 2016

(86) PCT No.: PCT/KR2016/013924
§ 371 (c)(1),
(2) Date: May 30, 2018

(87) PCT Pub. No.: WO2017/095120
PCT Pub. Date: Jun. 8, 2017

(65) Prior Publication Data
US 2018/0322336 A1    Nov. 8, 2018

(51) Int. Cl.
*G06K 9/00* (2006.01)
*H04N 13/239* (2018.01)
(Continued)

(52) U.S. Cl.
CPC ...... *G06K 9/00342* (2013.01); *G06K 9/00201* (2013.01); *G06T 7/593* (2017.01);
(Continued)

(58) Field of Classification Search
CPC ........... G06K 9/00342; G06K 9/00201; H04N 13/271; H04N 13/239; H04N 13/204;
(Continued)

(56) References Cited

U.S. PATENT DOCUMENTS 8,233,721 B2 * 7/2012 Wagg ................. G06K 9/00348
382/103
2004/0141635 A1 * 7/2004 Liang .................... A61B 5/1113
382/110

(Continued)

FOREIGN PATENT DOCUMENTS

JP     2012151851 A    8/2012
KR  1020110095588 A    8/2011

(Continued)

OTHER PUBLICATIONS

International Search Report dated Mar. 7, 2017 for PCT/KR2016/013924.

*Primary Examiner* — Aaron W Carter
(74) *Attorney, Agent, or Firm* — Cantor Colburn LLP

(57) ABSTRACT

The present invention includes: a three-dimensional moving image generation module for generating a moving image of an experiment target person; an object extraction module for extracting the experiment target person, separately from a background, from the moving image; an object definition module for defining an object by measuring a length, a size (Continued)

and a weight center of the object and extracting a depth image of the object; a behaviour pattern definition module for defining a basic behaviour pattern of the object by cumulatively analyzing a movement speed and movement time of the weight center of the corresponding object, and changes in the extracted depth data when the object defined by the object definition module is extracted by the object extraction module; and a behaviour pattern analysis module for analyzing and identifying a lasting time and a frequency of the basic behaviour pattern with respect to the object.

10 Claims, 4 Drawing Sheets

(51) Int. Cl.
    *H04N 13/271*      (2018.01)
    *G06T 7/73*      (2017.01)
    *G06T 7/593*      (2017.01)
    *H04N 13/204*      (2018.01)

(52) U.S. Cl.
    CPC .............. *G06T 7/73* (2017.01); *H04N 13/204* (2018.05); *H04N 13/239* (2018.05); *H04N 13/271* (2018.05); *G06T 2200/04* (2013.01); *G06T 2207/30196* (2013.01)

(58) Field of Classification Search
    CPC . G06T 7/593; G06T 7/73; G06T 2207/30196; G06T 2200/04
    See application file for complete search history.

(56) References Cited

U.S. PATENT DOCUMENTS

| | | | |
|---|---|---|---|
| 2004/0141636 A1* | 7/2004 | Liang | A61B 5/1113 382/110 |
| 2005/0163349 A1* | 7/2005 | Brunner | A61B 5/1038 382/110 |
| 2008/0152192 A1* | 6/2008 | Zhu | G06K 9/00771 382/103 |
| 2009/0226034 A1* | 9/2009 | Seki | G06T 7/246 382/103 |
| 2010/0111359 A1* | 5/2010 | Bai | G06K 9/00335 382/103 |
| 2010/0267462 A1* | 10/2010 | Mooney | A63B 69/36 473/269 |
| 2011/0081634 A1* | 4/2011 | Kurata | G01C 21/20 434/236 |
| 2011/0313705 A1* | 12/2011 | Esser | A61B 5/112 702/104 |
| 2014/0112530 A1* | 4/2014 | Yadani | G06K 9/00624 382/103 |
| 2014/0167958 A1* | 6/2014 | Kimchi | A01K 1/031 340/539.13 |
| 2015/0146939 A1* | 5/2015 | Datta | A01K 67/00 382/110 |
| 2016/0012278 A1* | 1/2016 | Banhazi | A01K 29/00 382/110 |
| 2018/0129873 A1* | 5/2018 | Alghazzawi | G06N 5/048 |
| 2018/0279921 A1* | 10/2018 | Datta | A61B 5/00 |
| 2019/0087965 A1* | 3/2019 | Datta | A61B 5/1128 |

FOREIGN PATENT DOCUMENTS

| | | | | |
|---|---|---|---|---|
| KR | 101260847 B1 | 5/2013 | | |
| KR | 1020140062389 A | 5/2014 | | |
| KR | 101470314 B1 | 12/2014 | | |
| KR | 101513215 B1 | 4/2015 | | |
| KR | 1020150100141 A | 9/2015 | | |
| WO | WO-2008098188 A2 * | 8/2008 | | G06K 9/00771 |

* cited by examiner

BEHAVIOUR PATTERN ANALYSIS SYSTEM AND METHOD USING DEPTH IMAGE

BACKGROUND

(a) Technical Field

The present invention relates to behaviour pattern analysis system and method and more particularly, to behaviour pattern analysis system and method using a depth image.

(b) Background Art

In the related art, various algorithms for a behaviour pattern analysis have been disclosed.

In Korean Patent Publication No. 10-2015-0100141 or Korean Patent Registration No. 10-1513215, a pattern analysis of an object in a moving image is exemplified. However, existing pattern analysis algorithms are limited to a regular pattern analysis such as movement of vehicles or license plate-recognized illegal parking of vehicles.

It is not easy to analyze a specific motion of a person or an animal. For example, it is not easy to analyze behaviour patterns such as sitting, standing, or roaming of the person or the animal. Furthermore, the accurate analysis is difficult because the specific motion of the person or the animal varies depending on a viewing direction. For example, in the jumping motions, in the case of jumping aside, it is easy to analyze the pattern, but in the case of jumping toward a camera or jumping in a diagonal direction, there is a difficulty in the analysis because the pattern change of the object appears differently.

In the related art, the patterns can be analyzed using an expensive motion analysis apparatus such as a VICON, but the pattern analysis is not performed using a general camera.

In the case of a long-term pattern analysis for an experiment target person or animal in a certain space, in such a situation, an experimenter directly observes the experiment target person or animal with naked eyes to analyze and record the behaviour pattern.

As a result, algorithms are needed to define and analyze the behaviour pattern of the experiment target person or animal easily and accurately using the general camera.

SUMMARY OF THE DISCLOSURE

An object of the present invention is to provide a behaviour pattern analysis system using a depth image.

Another object of the present invention is to provide a behaviour pattern analysis method using a depth image.

An exemplary embodiment of the present invention provides a behaviour pattern analysis system using a depth image including: a three-dimensional moving image generation module for generating a three-dimensional moving image of an experiment target person or animal in a certain space; an object extraction module for extracting the experiment target person or animal, separately from a background, from the three-dimensional moving image generated by the three-dimensional moving image generation module; an object definition module for defining an object by measuring a length, a size and a weight center of the object extracted by the object extraction module and extracting a depth image of the object; a behaviour pattern definition module for defining a basic behaviour pattern of the object by cumulatively analyzing a movement speed and movement time of the weight center of the corresponding object, and changes in the extracted depth data when the object defined by the object definition module is extracted by the object extraction module; and a behaviour pattern analysis module for analyzing and identifying a lasting time and a frequency of the basic behaviour pattern with respect to the object extracted by the object extraction module, using the basic behaviour pattern of the object defined by the behaviour pattern definition module.

Here, the behaviour pattern definition module may be configured to define a basic behaviour pattern of the experiment target person or animal by analyzing a change value of the depth image of the object and a pattern of the object changed per hour in the three-dimensional moving image.

In addition, the behaviour pattern definition module may be configured to define a basic behaviour pattern for sitting, standing, lying down, lying prone, roaming, jumping or hanging.

In addition, the behaviour pattern definition module may be configured to define a change pattern of a height, a change pattern per hour of the image of the object, and a movement speed of a weight center with respect to each basic behaviour pattern for sitting, standing, lying down, lying prone, roaming, jumping or hanging.

Meanwhile, the three-dimensional moving image generation module may be configured to generate the three-dimensional moving image by synthesizing images of a depth image camera.

Another exemplary embodiment of the present invention provides a behaviour pattern analysis method using a depth image including steps of: generating, by a three-dimensional moving image generation module, a three-dimensional moving image of an experiment target person or animal in a certain space; extracting, by an object extraction module, the experiment target person or animal, separately from a background, from the three-dimensional moving image generated by the three-dimensional moving image generation module; defining, by an object definition module, an object by measuring a length, a size and a weight center of the object extracted by the object extraction module and extracting a depth image of the object; defining, by a behaviour pattern definition module, a basic behaviour pattern of the object by cumulatively analyzing a movement speed and movement time of the weight center of the corresponding object, and changes in the extracted depth data when the object defined by the object definition module is extracted by the object extraction module; and analyzing and identifying, by a behaviour pattern analysis module, a lasting time and a frequency of the basic behaviour pattern with respect to the object extracted by the object extraction module, using the basic behaviour pattern of the object defined by the behaviour pattern definition module.

In this case, in the defining of the basic behaviour pattern of the object by the behaviour pattern definition module by cumulatively analyzing the movement speed and movement time of the weight center of the corresponding object and changes in the extracted depth data when the object defined by the object definition module is extracted by the object extraction module, a basic behaviour pattern of the experiment target person or animal may be defined by analyzing a change value of the depth image of the object and a pattern of the object changed per hour in the three-dimensional moving image.

In addition, in the defining of the basic behaviour pattern of the object by the behaviour pattern definition module by cumulatively analyzing the movement speed and movement time of the weight center of the corresponding object and changes in the extracted depth data when the object defined by the object definition module is extracted by the object extraction module, a basic behaviour pattern for sitting, standing, lying down, lying prone, roaming, jumping or hanging may be defined.

In addition, in the defining of the basic behaviour pattern of the object by the behaviour pattern definition module by cumulatively analyzing the movement speed and movement time of the weight center of the corresponding object and changes in the extracted depth data when the object defined by the object definition module is extracted by the object extraction module, a change pattern of a height, a change pattern per hour of the image of the object, and a movement speed of a weight center may be defined with respect to each basic behaviour pattern for sitting, standing, lying down, lying prone, roaming, jumping or hanging.

Meanwhile, in the generating of the three-dimensional moving image of the experiment target person or animal in the certain space by the three-dimensional moving image generation module, the three-dimensional moving image may be generated by synthesizing an image of a depth image camera.

According to the behaviour pattern analysis system and method using the depth image described above, it is possible to easily and accurately analyze a behaviour pattern of an experiment target person or animal by extracting a depth image from a three-dimensional moving image using a depth image camera and analyzing changes in image patterns.

Particularly, it is possible to accurately define and identify a behaviour pattern of an experiment target person or animal by analyzing a basic behaviour pattern of the experiment target person or animal using cumulated data.

Further, it is possible to perform a behaviour analysis of an experiment target person or animal without errors using general equipment without expensive equipment.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
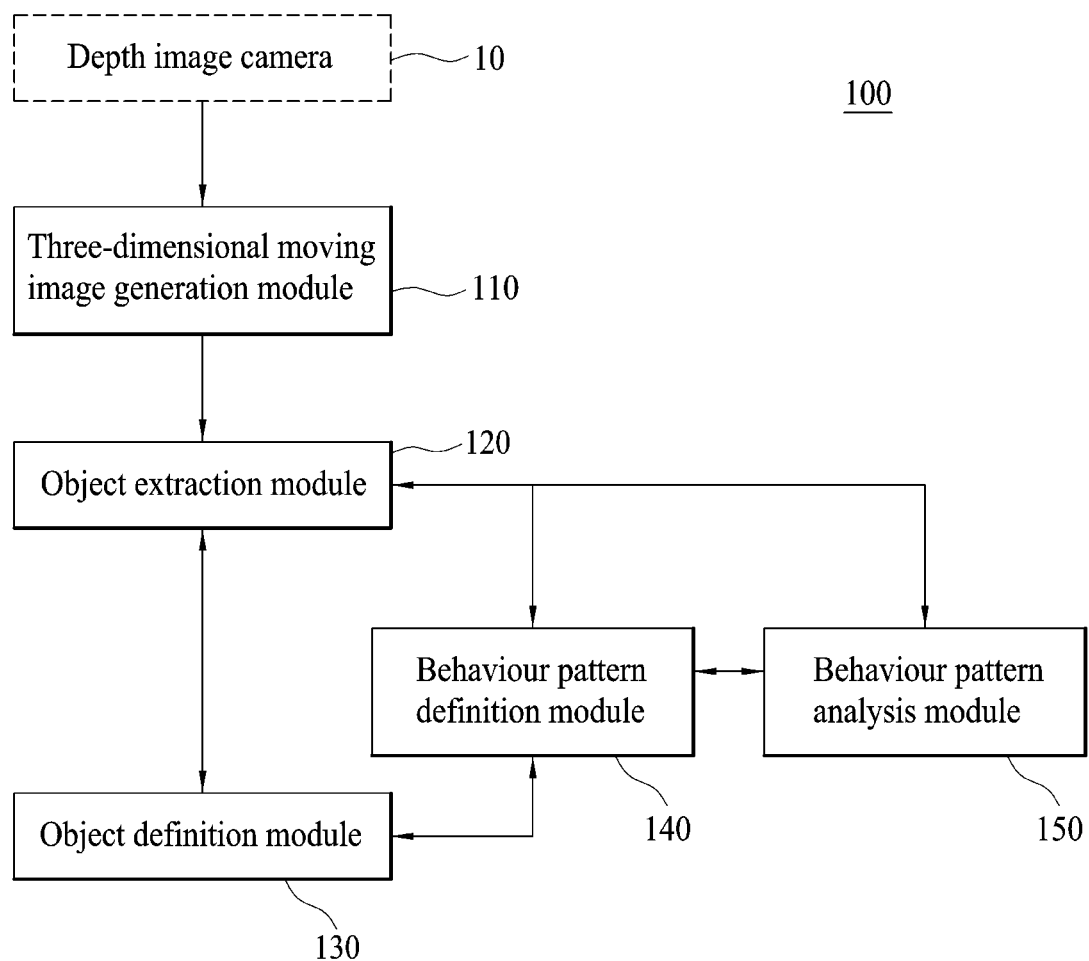
FIG. 1 is a block configuration diagram of a behaviour pattern analysis system using a depth image according to an exemplary embodiment of the present invention.

The present invention may have various modifications and various exemplary embodiments and specific exemplary embodiments will be illustrated in the accompanying drawings and described in detail in the detailed description for implementing the invention. However, the present invention is not limited to specific exemplary embodiments, and it should be understood that the present invention covers all the modifications, equivalents and replacements included within the idea and technical scope of the present invention.

In the description of each drawing, like reference numerals are used for like components.

Terms, such as first, second, A, B, and the like may be used to describe various components and the components should not be limited by the terms. The terms are used only to discriminate one component from another component. For example, a first component may be named as a second component and similarly, the second component may be named as the first component without departing from the scope of the present invention. A term 'and/or' includes a combination of a plurality of associated disclosed items or any item of the plurality of associated disclosed items.

It should be understood that, when it is described that a component is "connected to" or "accesses" the other component, the component may be directly connected to or access the other component or another component may be present therebetween. In contrast, it should be understood that, when it is described that a component is "directly connected to" or "directly access" the other component, it is understood that no component is present between the component and the other component.

Terms used in the present application are used only to describe specific exemplary embodiments, and are not intended to limit the present invention. A singular form may include a plural form unless otherwise clearly meant in the context. In the present application, it should be understood that the term "include" or "have" indicates that a feature, a number, a step, an operation, a component, a part or a combination thereof described in the specification is present, but does not exclude a possibility of presence or addition of one or more other features, numbers, steps, operations, components, parts or combinations thereof, in advance.

Unless otherwise defined, all terms used herein including technological or scientific terms have the same meanings as those generally understood by a person with ordinary skill in the art. Terms defined in generally used dictionary should be construed to have meanings matching those in the context of a related art, and should not be construed in ideal or excessively formal meanings unless otherwise clearly defined in the present application.

Hereinafter, preferred exemplary embodiments of the present invention will be described in detail with reference to the accompanying drawings.

FIG. 1 is a block configuration diagram of a behaviour pattern analysis system using a depth image according to an exemplary embodiment of the present invention.

Referring to FIG. 1, a behaviour pattern analysis system 100 using a depth image according to an exemplary embodiment of the present invention (hereinafter, referred to as a 'behaviour pattern analysis system') may be configured to include a three-dimensional moving image generation module 110, an object extraction module 120, an object definition module 130, a behaviour pattern definition module 140, and a behaviour pattern analysis module 150.

The behaviour pattern analysis system 100 is configured to precisely, accurately and automatically analyze and identify a behaviour pattern of an experiment target person or animal in a certain space by extracting a depth image of a three-dimensional moving image generated by a stereo image.

The behaviour pattern analysis system 100 can perform an error-free pattern analysis only by an accurate behaviour pattern analysis algorithm using the depth image in the three-dimensional moving image without expensive equipment. Specifically, since a basic behaviour pattern is defined through an accumulated pattern change of the object image, the accurate behaviour pattern analysis is possible.

The behaviour pattern analysis system 100 is a system for analyzing the behaviour pattern expressed by the experiment target person or animal in the certain space. The system is a system that can be used for experiment or therapy.

Hereinafter, the detailed configurations will be described.

The three-dimensional moving image generation module 110 may be configured to generate the three-dimensional moving image of the experiment target person or animal in the certain space. The experiment target person or animal may be captured in the moving image by photographing the space. The photographing may be performed by one or more depth image cameras 10, and the three-dimensional moving image generation module 110 generates the three-dimensional moving image by synthesizing stereo images generated by the two depth image cameras 10.

The object extraction module 120 may be configured to extract the experiment target person or animal, separately from a background, from the three-dimensional moving image generated by the three-dimensional moving image generation module 110 as a foreground.

Here, the background has shapes fixedly arranged in the certain space and usually has a fixed posture.

The object definition module 130 may be configured to measure a length, a size, and a weight center of the corresponding object with respect to the object extracted by the object extraction module 120. The length may be a height, a horizontal length, or the like, and the size may be an overall size. The weight center is a configuration for identify the movement of the object.

Meanwhile, the object definition module 130 may be configured to extract a depth image of the object from the three-dimensional moving image.

In addition, the object definition module 130 may be configured to define the corresponding object by the length, the size, the weight center, and the depth image of the object. Since the length, the size, and the like of the object may vary depending on a posture or direction taken by the experiment target person or animal, the object definition module 130 may be configured to define the object by comprehensively analyzing the depth image, the length, the size, and the like of the corresponding object.

The object defined by the object definition module 130 is extracted by the object extraction module 120, and the behaviour pattern definition module 140 may be configured to define a basic behaviour pattern of the object by cumulatively analyzing a movement speed and movement time of the weight center of the corresponding object, and changes in the extracted depth data with respect to the extracted object. That is, the basic behaviour pattern for any experiment target person, for example, lying, standing, or the like is not pre-defined, but defined through the behaviour pattern of the object which is cumulatively extracted from the three-dimensional moving image.

Here, more specifically, the behaviour pattern definition module 140 may be configured to define a basic behaviour pattern of the experiment target person or animal by analyzing a change value of the depth image of the object and a pattern of the object changed per hour in the three-dimensional moving image. That is, it is possible to analyze and define how quickly the pattern change of the experiment target person is performed, how the pattern is changed, or the like.

For example, the behaviour pattern definition module 140 may be configured to define a basic behaviour pattern for sitting, standing, lying down, lying prone, roaming, jumping or hanging.

Specifically, the behaviour pattern definition module 140 may be configured to define a change pattern of the height, a change pattern per hour of the image of the object, and a movement speed of the weight center with respect to each basic behaviour pattern for sitting, standing, lying down, lying prone, roaming, jumping or hanging. In the case of sitting, a change pattern of the height which is smaller than the height when standing may be defined and the weight center may be lowered. In the case of jumping, the weight center may be rapidly changed without a large change in the height, and in this case, the depth image is considered.

The behaviour pattern analysis module 150 may be configured to analyze and identify a lasting time and a frequency of the basic behaviour pattern with respect to the object extracted by the object extraction module 120, using the basic behaviour pattern of the object defined by the behaviour pattern definition module 140. In the related art, the observer needs to directly watch and record how often the behaviour pattern of standing occurs for a few minutes one by one. However, in the present invention, the behaviour pattern analysis module 150 may automatically analyze and identify the lasting time and the frequency with reference to the automatically pre-defined basic behaviour pattern.

Figure 2:
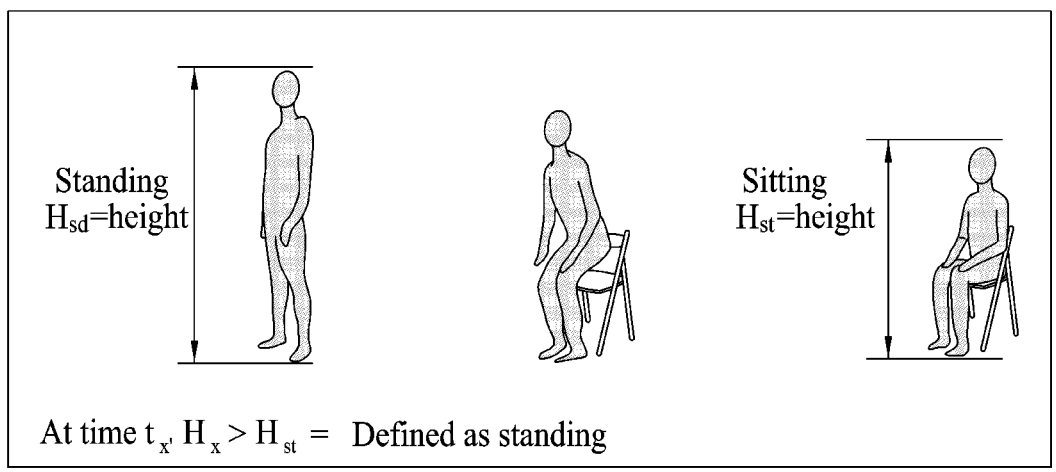
FIG. 2 is an exemplary diagram of a behaviour pattern analysis using a depth image according to an exemplary embodiment of the present invention.
Figure 3:
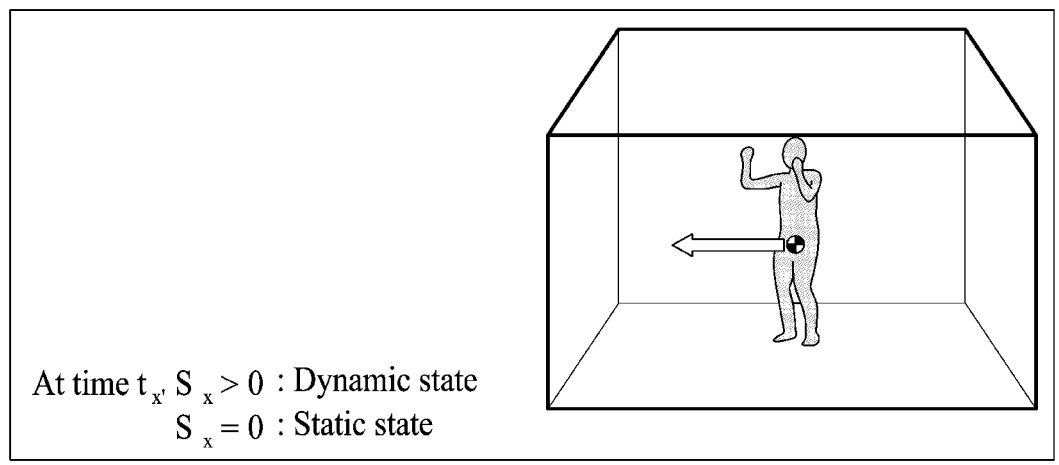
FIG. 3 is an exemplary diagram of a behaviour pattern analysis using a depth image according to another exemplary embodiment of the present invention.

FIG. 2 is an exemplary diagram of a behaviour pattern analysis using a depth image according to an exemplary embodiment of the present invention and FIG. 3 is an exemplary diagram of a behaviour pattern analysis using a depth image according to another exemplary embodiment of the present invention.

FIGS. 2 and 3 illustrate a process of analyzing a behaviour pattern through a change in height for the standing and a change in lasting time for the movement.

Figure 4:
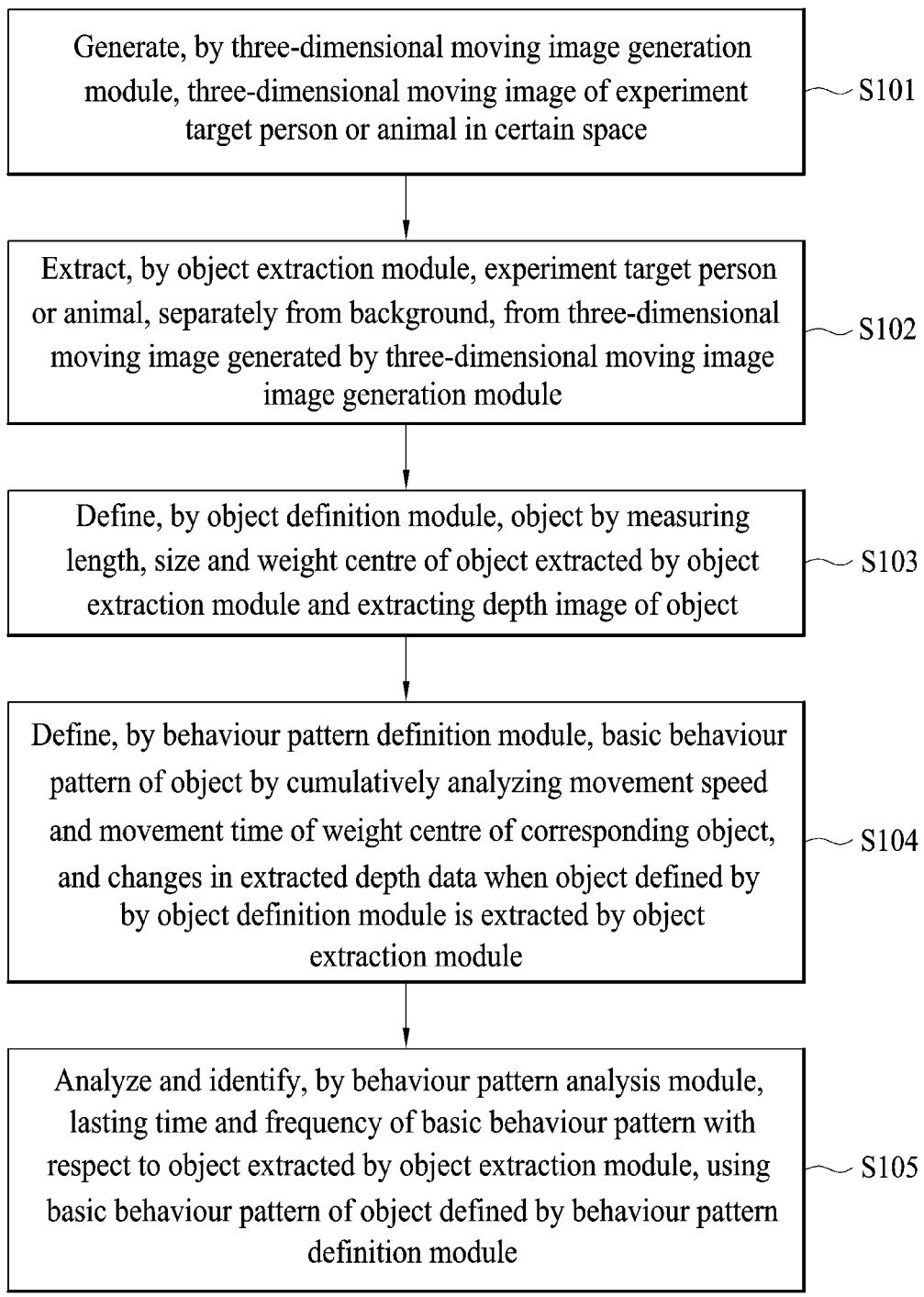
FIG. 4 is a flowchart of a behaviour pattern analysis method using a depth image according to an exemplary embodiment of the present invention.

FIG. 4 is a flowchart of a behaviour pattern analysis method using a depth image according to an exemplary embodiment of the present invention.

Referring to FIG. 4, first, a three-dimensional moving image generation module 110 generates a three-dimensional moving image of an experiment target person or animal in a certain space (S101). Here, the three-dimensional moving image generation module may be configured to generate the three-dimensional moving image by synthesizing images of a depth image camera 10.

Next, an object extraction module 120 extracts the experiment target person or animal, separately from a background, from the three-dimensional moving image generated by the three-dimensional moving image generation module 110 (S102).

Next, an object definition module 130 defines an object by measuring a length, a size and a weight center of the object extracted by the object extraction module 120 and extracting a depth image of the object (S103).

Next, when the object defined by the object definition module 130 is extracted by the object extraction module 120, a behaviour pattern definition module 140 defines a basic behaviour pattern of the object by cumulatively analyzing a movement speed and movement time of the weight center of the corresponding object, and changes in the extracted depth data (S104).

At this time, the behaviour pattern definition module 140 may be configured to define a basic behaviour pattern of the experiment target person or animal by analyzing a change value of the depth image of the object and a pattern of the object changed per hour in the three-dimensional moving image.

For example, the behaviour pattern definition module 140 may be configured to define a basic behaviour pattern for sitting, standing, lying down, lying prone, roaming, jumping or hanging.

At this time, the behaviour pattern definition module 140 may be configured to define a change pattern of the height, a change pattern per hour of the image of the object, and a movement speed of the weight center with respect to each basic behaviour pattern for sitting, standing, lying down, lying prone, roaming, jumping or hanging.

Next, a behaviour pattern analysis module 150 analyzes and identifies a lasting time and a frequency of the basic behaviour pattern with respect to the object extracted by the object extraction module, using the basic behaviour pattern of the object defined by the behaviour pattern definition module 140 (S105).

As described above, although the present invention has been described with reference to the exemplary embodiments, those skilled in the art will appreciate that the present invention can be variously corrected and modified without departing from the scope and the spirit of the invention as disclosed in the accompanying claims.

What is claimed is:

1. A behaviour pattern analysis system using a depth image comprising:
    a three-dimensional moving image generation module for generating a three-dimensional moving image of an experiment target person or animal in a certain space, wherein the experiment target person or animal refers to an object;
    an object extraction processor for extracting the object, separately from a background, from the three-dimensional moving image generated by the three-dimensional moving image generation module;
    an object definition processor for defining an object by measuring a length, a size and a weight center of the object extracted by the object extraction processor and extracting a depth image of the object;
    a behaviour pattern definition processor for defining a basic behaviour pattern of the object by cumulatively analyzing a movement speed and movement time of the weight center of the corresponding object, and changes in the extracted depth image when the object defined by the object definition processor is extracted by the object extraction processor; and
    a behaviour pattern analysis processor for analyzing and identifying a lasting time and a frequency of the basic behaviour pattern with respect to the object extracted by the object extraction processor, using the basic behaviour pattern of the object defined by the behaviour pattern definition processor.

2. The behaviour pattern analysis system of claim 1, wherein the behaviour pattern definition processor is further configured to define a basic behaviour pattern of the object by analyzing a change value of the depth image of the object and a pattern of the object changed per hour in the three-dimensional moving image.

3. The behaviour pattern analysis system of claim 1, wherein the behaviour pattern definition processor is configured to define a basic behaviour pattern for sitting, standing, lying down, lying prone, roaming, jumping or hanging.

4. The behaviour pattern analysis system of claim 3, wherein the behaviour pattern definition processor is further configured to define a change pattern of the height, a change pattern per hour of the image of the object, and a movement speed of the weight center with respect to each basic behaviour pattern for sitting, standing, lying down, lying prone, roaming, jumping or hanging.

5. The behaviour pattern analysis system of claim 1, wherein the three-dimensional moving image generation module is configured to generate the three-dimensional moving image by synthesizing images of a depth image camera.

6. A behaviour pattern analysis method using a depth image comprising steps of:
    generating, by a three-dimensional moving image generation module, a three-dimensional moving image of an experiment target person or animal in a certain space, wherein the experiment target person or animal refers to an object;
    extracting, by an object extraction processor, the object separately from a background, from the three-dimensional moving image generated by the three-dimensional moving image generation module;
    defining, by an object definition processor, an object by measuring a length, a size and a weight center of the object extracted by the object extraction processor and extracting a depth image of the object;
    defining, by a behaviour pattern definition processor, a basic behaviour pattern of the object by cumulatively analyzing a movement speed and movement time of the weight center of the corresponding object, and changes in the extracted depth image when the object defined by the object definition processor is extracted by the object extraction processor; and
    analyzing and identifying, by a behaviour pattern analysis processor, a lasting time and a frequency of the basic behaviour pattern with respect to the object extracted by the object extraction processor, using the basic behaviour pattern of the object defined by the behaviour pattern definition processor.

7. The behaviour pattern analysis method of claim 6, wherein in the defining of the basic behaviour pattern of the object by the behaviour pattern definition processor by cumulatively analyzing the movement speed and movement time of the weight center of the corresponding object and changes in the extracted depth image when the object defined by the object definition processor is extracted by the object extraction processor, a basic behaviour pattern of the object is defined by analyzing a change value of the depth image of the object and a pattern of the object changed per hour in the three-dimensional moving image.

8. The behaviour pattern analysis method of claim 6, wherein in the defining of the basic behaviour pattern of the object by the behaviour pattern definition processor by cumulatively analyzing the movement speed and movement time of the weight center of the corresponding object and changes in the extracted depth image when the object defined by the object definition processor is extracted by the object extraction processor, a basic behaviour pattern for sitting, standing, lying down, lying prone, roaming, jumping or hanging is defined.

9. The behaviour pattern analysis method of claim 8, wherein in the defining of the basic behaviour pattern of the object by the behaviour pattern definition processor by cumulatively analyzing the movement speed and movement time of the weight center of the corresponding object and changes in the extracted depth image when the object defined by the object definition processor is extracted by the object extraction processor, a change pattern of the height, a change pattern per hour of the image of the object, and a movement speed of the weight center is defined with respect to each basic behaviour pattern for sitting, standing, lying down, lying prone, roaming, jumping or hanging.

10. The behaviour pattern analysis method of claim 9, wherein in the generating of the three-dimensional moving image of the object in the certain space by the three-dimensional moving image generation module, the three-dimensional moving image is generated by synthesizing images of a depth image camera.

\* \* \* \* \*